US008620676B2

(12) United States Patent
Geller et al.

(10) Patent No.: US 8,620,676 B2
(45) Date of Patent: *Dec. 31, 2013

(54) ELECTRONIC CREDENTIALS VERIFICATION AND MANAGEMENT SYSTEM

(75) Inventors: Marilyn Grunzweig Geller, Woodland Hills, CA (US); Matthew J. Haddad, Marina del Rey, CA (US)

(73) Assignee: Medversant Technologies, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,786

(22) Filed: Jan. 27, 2012

(65) Prior Publication Data

US 2013/0030989 A1     Jan. 31, 2013

Related U.S. Application Data

(63) Continuation of application No. 12/435,375, filed on May 4, 2009, now Pat. No. 8,131,558, which is a continuation of application No. 10/316,821, filed on Dec. 11, 2002, now Pat. No. 7,529,682.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
USPC .......................................................... 705/1.1

(58) Field of Classification Search
None
See application file for complete search history.

(56) References Cited

U.S. PATENT DOCUMENTS

2003/0236682 A1* 12/2003 Heyer ............................... 705/2

* cited by examiner

*Primary Examiner* — Jonathan Ouellette
(74) *Attorney, Agent, or Firm* — Baker Hostetler LLP

(57) ABSTRACT

A credentials record system that captures personnel background data, such as license information, education and training, work experience, performance data and electronic signature at the time of entry using graphical user interfaces through a network, wherein it permits instant, sophisticated analysis of background data to identify relationships among the data, including archived data and includes the capability to access reference databases for consultation regarding verification of data for accuracy on a continuous basis. The system also provides for an automated auditing process to ensure data integrity and includes the capability to incorporate legacy data, such as paper files and mainframe data, for each personnel record.

42 Claims, 10 Drawing Sheets

ELECTRONIC CREDENTIALS VERIFICATION AND MANAGEMENT SYSTEM

CROSS REFERENCE TO RELATED APPLICATIONS

This application is a continuation of and claims priority to application Ser. No. 12/435,375, entitled "ELECTRONIC CREDENTIALS VERIFICATION AND MANAGEMENT SYSTEM", filed May 4, 2009, now U.S. Pat. No. 8,131,558, which is, in turn, a continuation of application Ser. No. 10/316,821 entitled "ELECTRONIC CREDENTIALS VERIFICATION AND MANAGEMENT SYSTEM", filed Dec. 11, 2002, now U.S. Pat. No. 7,529,682, the entire contents of which are herein incorporated by reference.

FIELD OF THE INVENTION

The present invention generally relates to electronic management systems, and more particularly, to a system for storing, continually verifying and retrieving credentials records in a global network environment.

BACKGROUND

Professionals are frequently required to be licensed and to undergo rigorous screening before practicing their profession. For example, healthcare practitioners, such as physicians, are typically required by federal, state and regulatory agencies to have a thorough background check when initially applying to hospitals, health maintenance organizations, independent physician associations and other like healthcare entities. In addition, once approved by an entity, the practitioner's background must be re-checked at periodic intervals through the course of his tenure with the healthcare entity. However, practitioner background checks create large volumes of data that must be stored, validated, analyzed and updated on a continuous basis. Such data includes at a minimum, education, training, licensure and license sanctions, work experience, malpractice insurance coverage, malpractice history and peer references.

It may be possible for professional organizations to use electronic data processing systems to automate the creation, use and maintenance of credentials in a manner that is similar to systems currently employed for the storing and management of other occupational data. However, these electronic data processing systems often do not handle data in the wide variety of data formats that may typically be used for credentials verification by healthcare entities. The wide variety of data formats for the collection of credentials information often hinders electronic processing and maintenance of practitioner files. Moreover, many professional practitioners have traditionally used paper-based forms to document their credentials information.

In addition, under current practices there may be significant duplication of credentials information. For example, within healthcare systems similar credentials information may exist in remote practitioner files located at clinics, hospitals, laboratories and physicians' offices. However, due to inefficiencies with current methods of data collection and verification, including the inability of current electronic systems to allow for the sharing of a central record of practitioner data, it is common for practitioner files at one entity to have credentials information that differs from the same practitioner files at another entity within the same system. Such differences may include missing data as well as differing experience, performance and license sanctions histories.

Further, credentials information in the practitioner files is generally not available for review by the practitioners themselves to confirm or dispute the information. Moreover, relationships among specific credentials information documented in a practitioner file such as adverse actions, gaps in work history and misstatements on the credentials application may not be apparent unless manually pulled together as a whole.

In addition, in the current environment, specific credentials information is difficult to access when needed for analysis due to its paper-based nature. Moreover, in current systems the use of a practitioner's file by one entity can preclude its simultaneous use by another entity. Under these circumstances, entities have difficulty ascertaining the fitness of their practitioners to provide services for their customers.

SUMMARY OF THE INVENTION

In one aspect of the present invention a method for electronically verifying information includes requesting credentials information from applicants in a plurality of formats, collecting received credentials information from the applicants in a common format through an interface to a global network, storing collected credentials information in a dynamic database and verifying collected credentials information with external sources through an electronic interface.

BRIEF DESCRIPTION OF THE DRAWINGS

The present invention will become better understood with regard to the following description, appended claims, and accompanying drawings, in which:

DETAILED DESCRIPTION OF THE INVENTION

An exemplary embodiment of a web based credentials acquisition, storage, verification and audit system (WebCVO) automates and simplifies existing methods of credentials information collection, verification, audit, maintenance and retrieval. In contrast to other systems, the described exemplary embodiment creates and maintains all credentials information electronically and thus can eliminate or supplement the creation and maintenance of physical data records. An exemplary WebCVO may further provide an intuitive, easy-to-use, web-based interface that allows users to capture and analyze credentials information quickly and efficiently. In accordance with an exemplary embodiment, credentials information may be entered into the electronic credentials system from paper-based forms or may be imported from electronic storage devices (diskette, CD-ROM, tape or the like). Alternatively, credentials information may also be scanned in through the use of a teleform or directly entered by a practitioner into the WebCVO system.

In addition, the described exemplary WebCVO system may include the capability to manage and report on a wide variety of credentials information formats, including credentials information from external sources, such as licensing organizations and governmental databases. In accordance with an exemplary embodiment, the WebCVO system may continuously access external sources to validate current credentials information. The WebCVO system may then alert the practitioner and all entities to which that practitioner is assigned of any information not validated by an external source and to information reported by the source but not recorded in the practitioner's credentials record.

The described exemplary WebCVO system may also prompt practitioners to renew credentials information prior to the expiration of that information. In addition, an exemplary WebCVO system can also incorporate a practitioner's legacy data, such as quality information, into the practitioner record as well as legacy data from mainframe computers.

Figure 1:
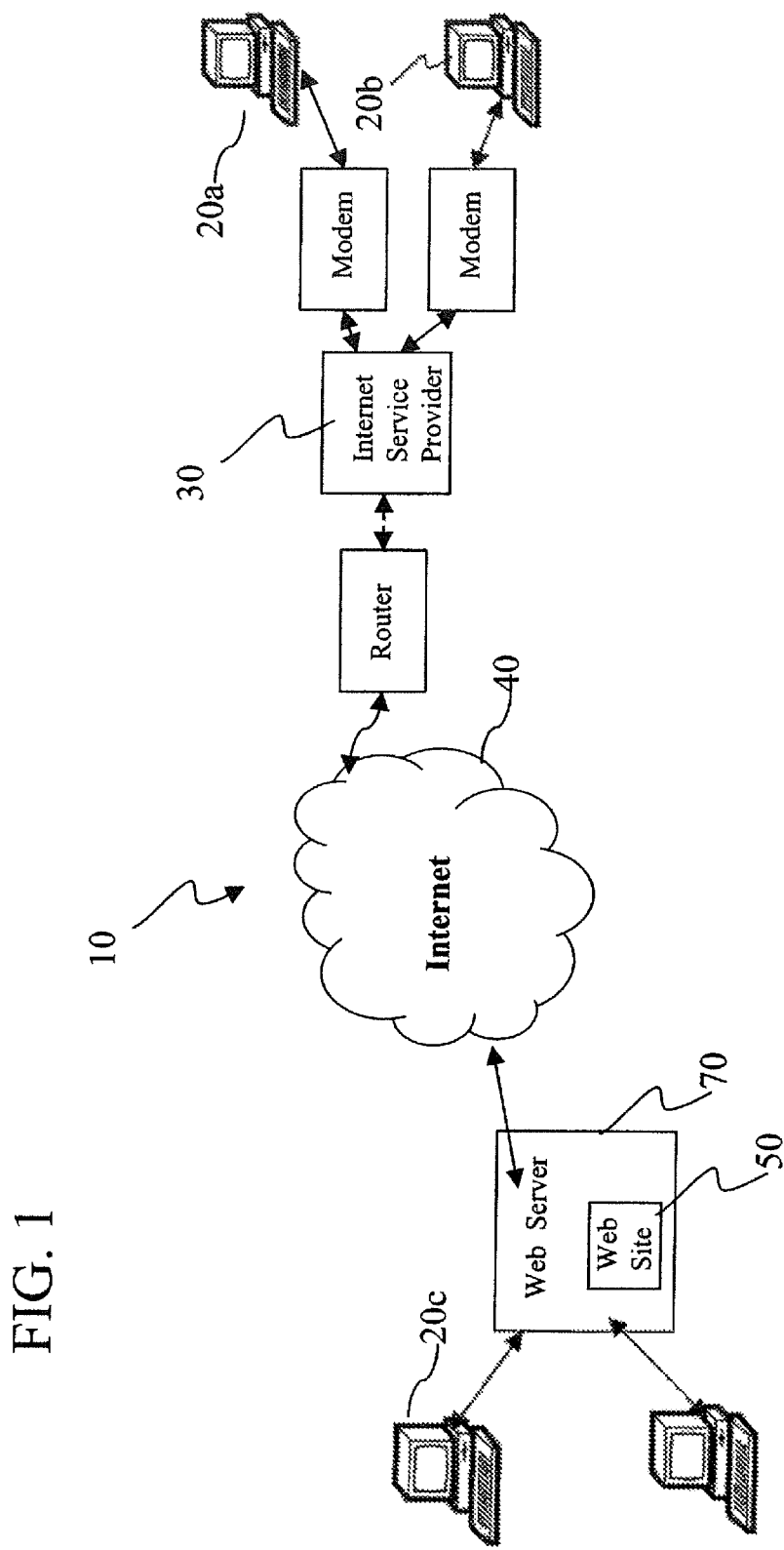
FIG. 1 is a simplified block diagram of an electronic credentials verification system in accordance with an exemplary embodiment of the present invention.

FIG. 1 illustrates an exemplary electronic credentials system 10. The described exemplary electronic credentials system 10 includes multiple remote devices 20a and 20b coupled to one or more web servers 30 through a remote communication network 40. The communication network may refer to a network or combination of networks spanning any geographical area, such as a local area network, wide area network, regional network, national network, and/or global network. The Internet is an example of a current global computer network. In addition, the communication network may be a hardwire network, wireless network, or a combination of hardwire and wireless networks.

Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

The remote devices 20a-20b may be general purpose computing devices that allow users to remotely communicate with the web server over the communication network 40. The computing devices may be any processor controlled device that permits access to the communication network, including terminal devices, such as personal computers, workstations, servers, clients, mini-computers, main-frame computers, laptop computers, a network of individual computers, mobile computers, palm-top computers, hand-held computers, set top boxes for a television, other types of web enabled televisions, interactive kiosks, personal digital assistants, interactive or web enabled wireless communications devices, mobile web browsers, or a combination thereof.

The computers may comprise one or more input devices such as a keyboard, mouse, touch pad, joystick, pen input pad, and the like. The computers may also possess an output device, such as a visual display and an audio output. One or more of these computing devices may form a computing environment.

An exemplary web server 70 preferably hosts a website 50 comprising one or more interrelated web page files and other files and programs. The files and programs may be accessed via a communications network 40 such as the Internet, by sending for example, a hypertext transfer protocol (HTTP) request specifying a uniform resource locator (URL) that identifies the location of one of said web page files, wherein the files and programs are owned, managed or authorized by a single entity. Such files and programs can include, for example, hypertext markup language (HTML) files, common gateway interface (CGI) files, and Java applications.

In an exemplary embodiment, the web page files preferably include a home page file that corresponds to a home page of the website. The home page can serve as a gateway or access point to the remaining files and programs contained within the website. In one embodiment, all of the files and programs may be located under, and accessible within, the same network domain as the home page file. Alternatively, the files and programs can be located and accessible through several different network domains.

The described exemplary website may use encryption technology such as for example secure socket layer (SSL) encryption and digital certificates to maintain the integrity and confidentiality of electronic transmissions to and from the Web server 70. In the described exemplary embodiment message data is encrypted using a randomly generated key that is further encrypted using the recipient's public key. This is referred to as the "digital envelope" of the message which is sent to the recipient with the encrypted message. The recipient decrypts the digital envelope using a private key and then uses the symmetric key to unlock the original message.

Figure 2:
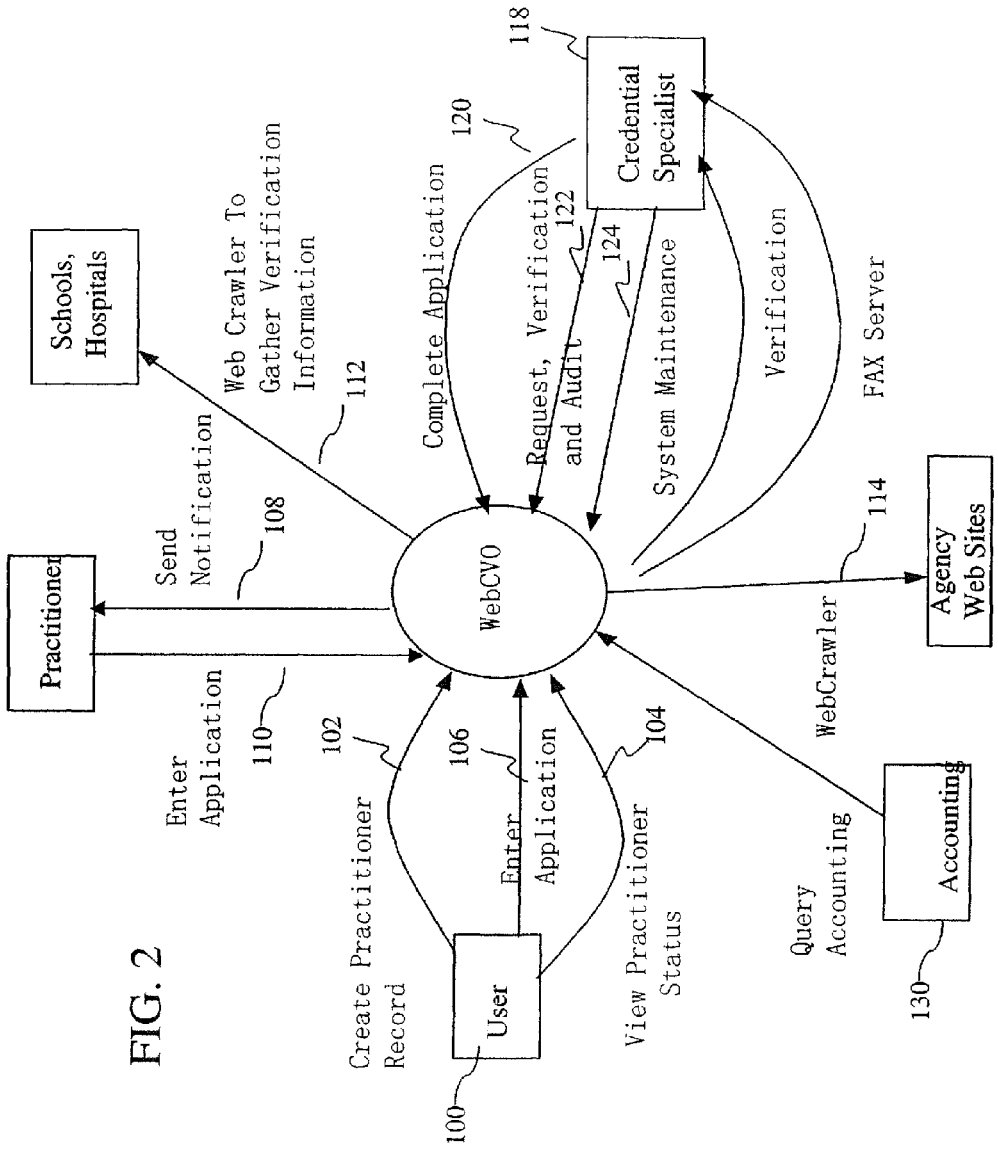
FIG. 2 is a graphical illustration of the relationship of the applicant, client, electronic verification sources and non-electronic verification sources in accordance with an exemplary embodiment of the present invention.

FIG. 2 graphically illustrates the relationship of the practitioner, client, electronic verification sources and non-electronic verification sources within an exemplary electronic credentials system. The described exemplary electronic credentials system gives users considerable freedom to manage, maintain and utilize the functionality of the system. For example, users 100 can create new practitioner accounts 102 including a credentials application which a practitioner may then complete. In an exemplary embodiment, the system may automatically send a notification 108 to the practitioner preferably instructing the practitioner to log on to the system and input his credentials information 110.

An exemplary system may send the notification by any of a number of conventional means, such as by email, fax, letter or a combination thereof. In one embodiment an exemplary system may assign a contact method based upon the practitioner's preference for receiving credentials information requests. Further, an exemplary system may automatically send an email to practitioners which includes instructions on how to access the credentials system electronically (e.g.

online) as well as requests for the updating or clarifying of credentials information. An exemplary system may compare existing data to newly entered data and archive existing data to a history table.

In one embodiment, the electronic credentials system may automatically forward a fax with instructions for online access or instructions for receiving a blank credentials application via Internet download, fax or mail to a practitioner. The described exemplary electronic credentials system may also automatically fax or print for mailing complete credentials packages, including instructions and application materials. The described exemplary system may also automatically contact practitioners opting to complete a paper application via fax or letter generation for the completion, update and clarification of their credentials.

In one embodiment a user may also view, the status of an existing practitioners 104 credential application or re-verification, plan committee and continuing education meetings and create customized pages for their own use 106. In addition, the described exemplary system may identify verification requirements for a particular practitioner including the parameters for handling adverse information. The described exemplary system may then automatically contact various entities such as, for example, schools, hospitals, or peers to request verification information 112, via for example, a web crawler, link, or other conventional method of querying a database.

For example, in an online verification system an encrypted request for verification may be included as parameters on an HTTPS query string to verification sites. In one embodiment the request may further include payment of a verification fee. The described exemplary system may also auto-generate email, fax or letter requests to non-electronic verification sources including payment of verification fees.

An exemplary system may send requests for verification information by fax, letter or email (if choose by phone, an exemplary system may schedule phone calls for WebCVO credentials specialists). An exemplary system may also automatically check the websites of all government agencies (for example, via a web crawler, link or other conventional method of querying a database), or other regulatory bodies for information related to the practitioner's credentials. In addition, an exemplary system may make follow-up requests for verification information according to a pre-set schedule.

The described exemplary system may compare the verification information received from external sources to the credentials information submitted by the applicant. An exemplary system may then auto-update the database with matched information or manually update the database through the use of electronic work prompts or ticklers.

For example, in an exemplary embodiment, a credentials specialist 118 may compile the responses to the requests for verification information and perform various other tasks to complete the application process 120. A credentials specialist may then utilize a fax server or other similar means to verify and audit the practitioner information 122.

In an exemplary embodiment, the received verification information may be archived in an online data repository, allowing web access and tracking. For example, in the described exemplary embodiment, electronic information received from verification sites may be stored as digital images in an applicants database. Similarly, verification information received from non-electronic sources may be scanned and stored as scanned images. The described exemplary system may further comprise an accounting component that tracks all individual itemized charges in accordance with particular contract requirements 130.

An exemplary embodiment of the present invention may also provide instant access to a practitioner's electronic credentials record by authorized entities from any geographic location. For example, the described exemplary system may provide authorized entities to access and update practitioner files using, for example, the Internet. To enable complete replacement of physical records, the present invention permits practitioners to electronically annotate practitioner data. Thus, a practitioner can enter and update credentials information, acknowledge that he or she has reviewed posted credentials information. A practitioner may also provide explanations for any information not validated by an external source or for information reported by a source, not currently posted to the practitioner's record, all by electronically annotating a practitioner's record.

Figure 3:
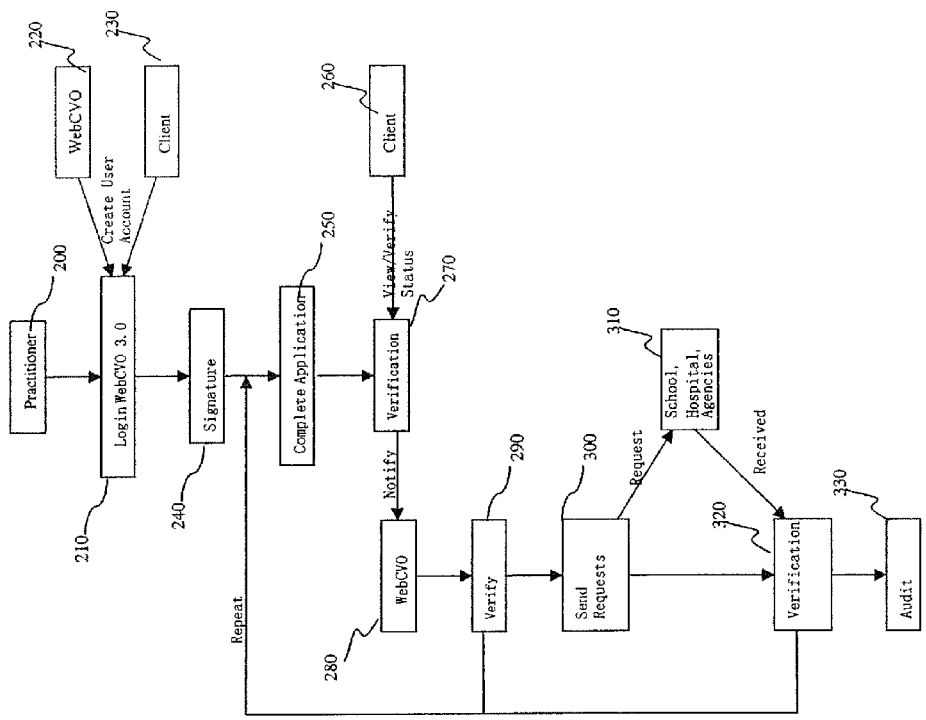
FIG. 3 graphically illustrates the logic flow of an electronic credentialing process in accordance with an exemplary embodiment of the present invention.

For example, FIG. 3 graphically illustrates the logic flow of an exemplary credentialing process. In one embodiment practitioners 200 may logon to the described exemplary electronically credentialing system 210 and view their own credentials information online. In addition, in an exemplary embodiment the organizations which collect and verify submitted credentials applications may also remotely logon to the system via a global computer network, such as, for example the Internet 220. In addition, organizations that outsource this responsibility to another organization such as for example, health plans, health systems, hospitals, managed services organizations, preferred provider organizations, medical groups, and independent practice associations may also be provided remote access to the described exemplary system 230.

The described exemplary system may grant different types of users varying degrees of access to the WebCVO system. In one embodiment the described exemplary system may utilize assigned login IDs and passwords to redirect users to different web pages for different functionalities. In addition, an exemplary system may sign each practitioner record with an electronic signature 240. This signature may be captured either through electronic creation by the practitioner or by the scanning of a practitioner's actual signature.

An exemplary system may require practitioners to complete all mandatory data fields before submitting a credentials application for verification 250. An exemplary embodiment of the present invention allows for the assigning of required data fields by practitioner type and verification phase. For example, in one embodiment practitioners may be required to complete a set of data fields pertinent to their field of practice. Practitioners may also be required to complete an initial set of data fields (also pertinent to their field of practice) and upon satisfactory verification of those fields, the practitioner may then be required to complete a secondary, tertiary, etc. set of data fields. In accordance with an exemplary embodiment the required fields are assigned when a practitioner's record is created.

In addition, for applications submitted online, the organization performing credentials verification may view the application and approve it for verification initiation 260. In practice the described exemplary system may automatically initiate the verification process 270 for submitted applications that are approved for verification 280.

The described exemplary system may retrieve electronic data from primary source verification websites 290. The described exemplary system may send requests to non-electronic data sources via email, letter or fax, (or phone) including a copy of a release from the corresponding practitioner with electronic signature and delineation of privileges, if desired 300.

An exemplary system may correlate the verification information received from external sources with the credentials information entered by the applicant. The described exemplary system may auto-update the database for matched data. In addition, in one embodiment the described exemplary system may attempt to identify reasons for a mismatch between the verification data received from external sources and the credentials information entered by the applicant.

For example, the system may electronically or manually attempt to identify clerical errors, such as typographical errors that may occur during the conversion of a scanned document to text by an optical character recognition program. The system may then request that the applicant provide an explanation for any data mismatches that cannot be attributed to errors in the data entry or correlation process. An exemplary system may then verify newly entered data by correlating it with the verification information received from the external sources.

In one embodiment, the system may automatically track the receipt of verification information and may automatically re-send verification requests if information is not received. In an exemplary embodiment, time frame intervals for the re-sending of verification requests are determined by the verifying organization. Further, non-responsive sources may be routed to an electronic tickler program for distribution to and follow up by credentials staff.

Non-electronic data sources may return requested verifications through email, fax, letter or the like 310. The described exemplary system may route information received from non-electronic sources to an electronic work tickler for distribution to and verification by credentials staff 320. Alternatively, if the verification information is received via teleform it may be auto updated to the database.

In addition, an exemplary system may route mismatched data as well as matched data to an electronic tickler for distribution to and manual verification by credentials staff 290. In addition, in one embodiment, the described exemplary system may route practitioner information to an audit program to confirm verification was performed correctly 330. The described exemplary system may utilize a single, double or triple audit process.

Figure 4:
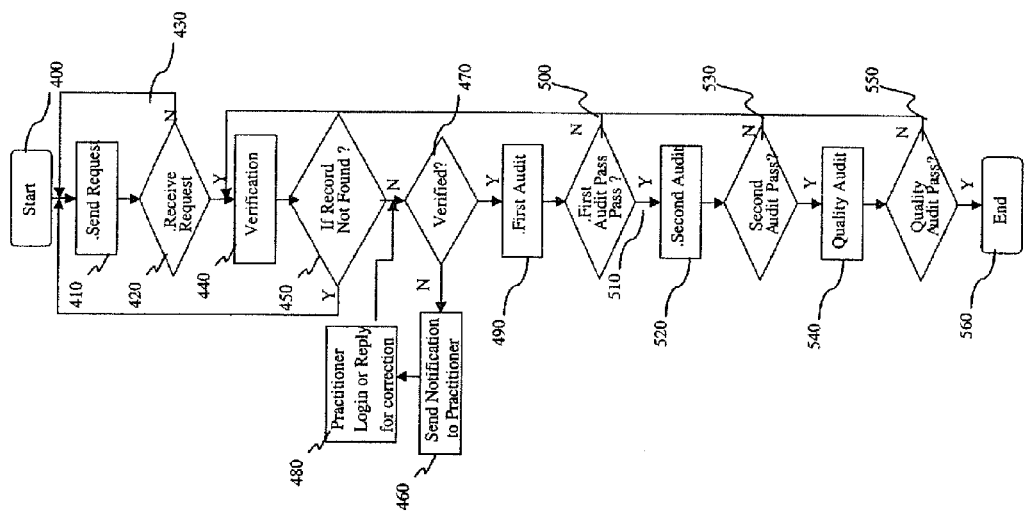
FIG. 4 is a flow chart illustrating an audit process for the verification of credentials information in accordance with an exemplary embodiment of the present invention.

For example, FIG. 4 graphically illustrates an exemplary triple audit process. In operation, the described exemplary system may manually or automatically send requests to verifying sources 410 in response to a verification request from a credentialing organization 400. In one embodiment the system may mark information received in response to verification requests for verification 420. Otherwise the system may automatically send another request to the verifying sources in accordance with preset time intervals until the requested verification information is received 430. If a response to the request is not received the system may route the information to an electronic work distribution and reminder program for processing by the credentialing organization.

In practice the credentialing organization or the WebCVO verifies information received from the verifying source 440. If a verifying source responds with a "Record Not Found" response 450, the described exemplary system may notify the practitioner via email, fax or letter 460 and ask for corrected information. The practitioner may then respond with corrected information 480 and the system may then send another request to the verifying source 410 with corrected information.

The described exemplary system may route verified credentialing information to an electronic work distribution program for auditor review 490. In one embodiment, the auditor reviews the verification information received to ensure that it matches that reported on the practitioner's credentials application. If the verification information received matches that reported by the practitioner, the auditor marks the audit as "Pass." In the event the verification information received does not match that reported by the practitioner, the auditor marks the audit as "Fail."

Should the auditor mark the first audit as failed 500, the original verification is archived and the verification and audit processes are re-initiated. Should the auditor mark the first audit as passed 510, credentialing information is routed to an electronic work tickler for second auditor review 520. Should the auditor mark the second audit as failed 530, the original verification is archived and the verification and audit processes are re-initiated.

In one embodiment, the system may route information that passes two consecutive verification audits to an electronic work distribution program for quality audit review of all verifications 540. Should the auditor mark the quality audit as failed 550, the original verification is archived and the verification and audit processes are re-initiated, otherwise the verification audit has been successfully completed 560.

The described exemplary electronic credentials verification system preferably supports a plurality of data methods of credentials information input. For example, in one embodiment an applicant may enter credentials information from a global computer network such as, for example, the Internet. Alternatively, credentials information may also be imported from a variety of sources such as, for example, a CD-ROM, teleform that is scanned in using optical character recognition, etc. In an exemplary embodiment, the system may require the applicant to provide complete information by continually contacting the applicant via email, fax, letter or a combination thereof until all information is complete.

Figure 5:
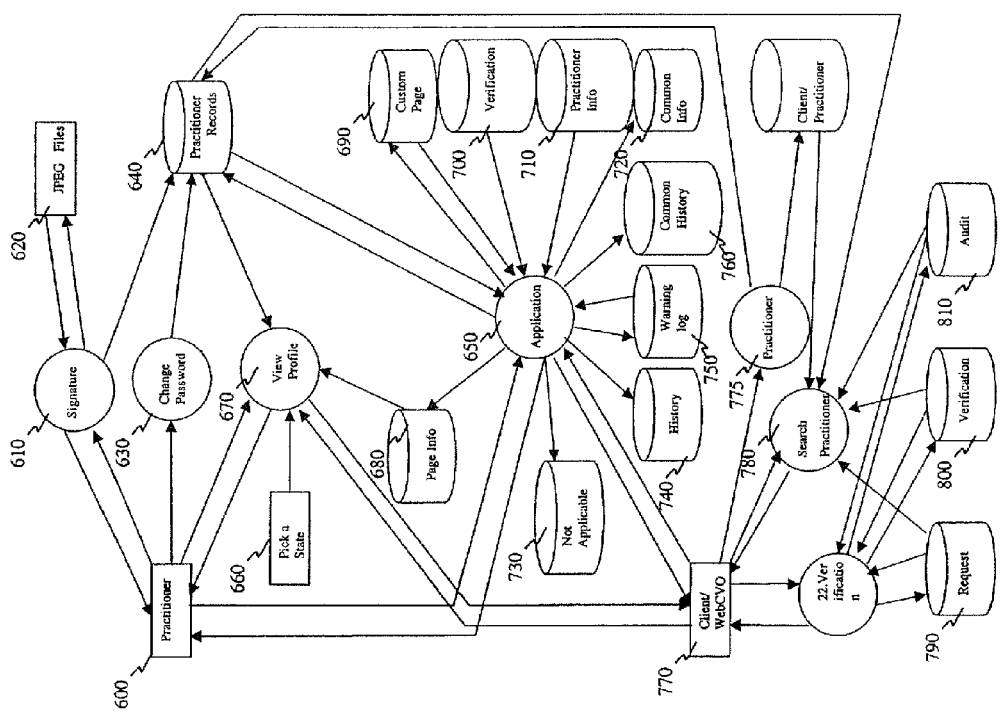
FIG. 5 graphically illustrates an online electronic verification process in accordance with an exemplary embodiment of the present invention.

FIG. 5 graphically illustrates an exemplary online credentials application process. For online application submissions, the described exemplary system may automatically or manually assign a login ID and password to a practitioner 600 for system access. In an exemplary process, a practitioner must review and accept an information release agreement and create a signature 610 after logon to the system. The described exemplary system may capture a scanned signature or an electronic signature for each practitioner and may digitally convert the captured signature to a globally unique identifier (GUID). In one embodiment, a scanned in signature may be saved in PEG format 620.

In an exemplary embodiment, the system records the user identification and date and time for each piece of data entered and any and all subsequent changes to provide a complete audit trail for credentials information entered into the system. In this manner, the system transforms a practitioner's credentials application from a static record into a dynamic, real-time comprehensive record that may be linked to enterprise-wide databases to capture or supplement other practitioner data.

In one embodiment, the system may prompt the practitioner to change his or her password 630 and may create a practitioner record by selecting from a set of required data fields that are pertinent to the practitioner's field of practice as well as an initial set of required data fields (also known as a pre-application). When the pre-application is verified an exemplary system may require the practitioner to complete a secondary, tertiary, etc. set of required data fields. An exemplary embodiment of the present invention may also support the creation of practitioner records having additional data fields that are not included in the standard applications stored in the credentials information applications repository 650.

In the described exemplary embodiment, a practitioner may select credentials applications by state from the application library 660. In one embodiment, a practitioner may retrieve and view the selected credentials application 670 which is populated with the specific information entered by the practitioner 680.

The credentials application 650 may comprise a variety of user defined custom pages 690, the results of the verification processes 700, as well as additional practitioner data input through modification 710. An exemplary credentials application may further comprise common data information 720 such as information received from insurance carriers, schools, hospitals, government agencies, etc. The application may also include pages (tabs) that may be marked as not applicable to the particular practitioner 730, as well as archived data 740, a warning log comprised of data mismatches and identified adverse actions 750 and common field level history tracking data 760.

In one embodiment the application may be composed of elements that conform to a standardized programming language such as, for example, the extensible markup language (XML) specification. As is known in the art, XML is a markup language for documents containing structured information. Structured information contains both content (words, pictures, etc.) and some indication of what function that content performs. The utilization of a standardized programming language further promotes the automatic utilization of the credentials information across enterprise-wide databases to capture or supplement other practitioner data.

In one embodiment organizations 770 may have access to practitioner applications 775 and practitioner 775 records 640. An organization may also search practitioners in the system 780 to retrieve and review requested information 790, verification information 800 and audit information 810. Organizations may also access practitioner verification information to view the status and detailed information 820.

Figure 6:
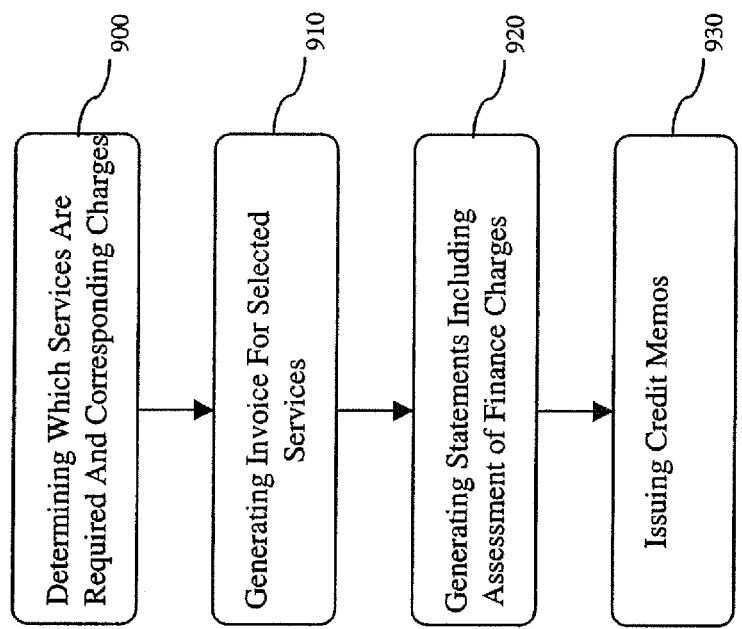
FIG. 6 graphically illustrates a process for creating and maintaining accounting records associated with the verification of credentials information in accordance with an exemplary embodiment of the present invention.

Referring to FIG. 6, an exemplary embodiment of the present invention may create and maintain accounting records associated with the verification of credentials information. For example, the described exemplary system may determine which services are required for a particular client as well as the charges associated with those services 900. The described exemplary embodiment may then automatically generate an invoice for the appropriate services when they are performed. 910. The system may also generate accounting statements in accordance with the appropriate services including assessments of finance charges where appropriate 920. The system may then automatically issue credit memos 930 from the accounting statements 930.

Figure 7:
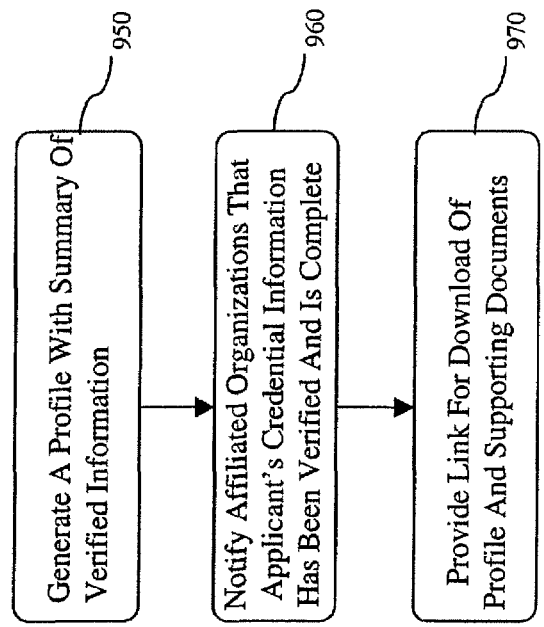
FIG. 7 graphically illustrates a process for generating verified credentials profile information including copies of records from external sources in accordance with an exemplary embodiment of the present invention.

Referring to FIG. 7, an exemplary embodiment of the present invention may also generate verified credentials profile information including copies of all records from external sources. For example, in one embodiment, the described exemplary system may generate a profile with a synopsis of verified information as required by regulatory agencies within the field of practice of the applicant 950. The described exemplary system may also notify affiliated organizations that the applicant's credentials information has been verified or re-verified and is complete. The system may also provide a hyperlink 970 to a site from which interested parties may download the verified credentials profile. The system may further make copies of the electronic and scanned documents utilized in the verification process available for download as well.

Figure 8:
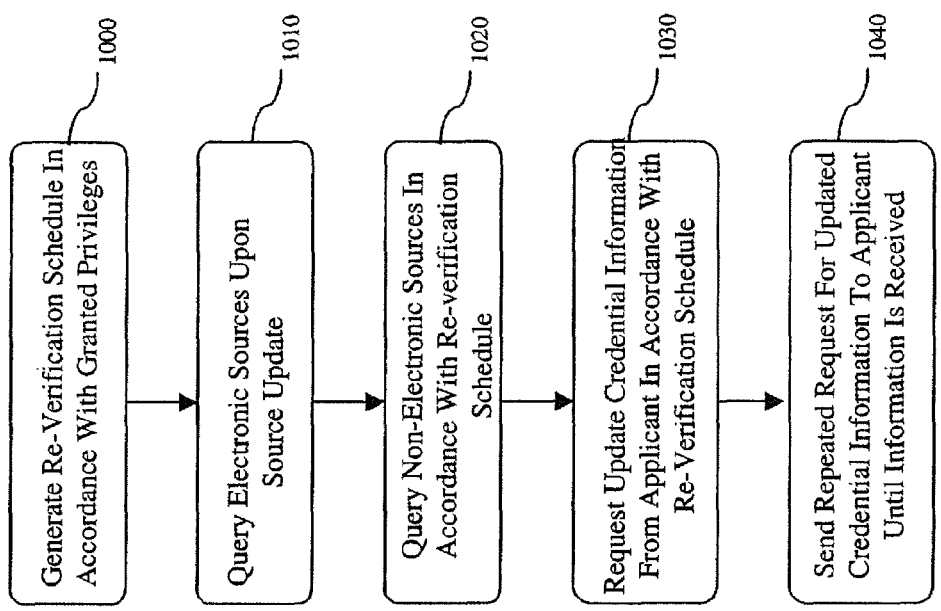
FIG. 8 graphically illustrates a process for creating and maintaining a continuous calendar of re-verification of an applicant's credentials in accordance with an exemplary embodiment of the present invention.

Referring to FIG. 8 an exemplary embodiment of the present invention may also create and maintain a continuous calendar of re-verification of an applicant's credentials information. For example, an exemplary system may create a re-verification schedule in accordance with the requirements for re-verification for a particular set of privileges 1000. The described exemplary system may then query electronic sources 1010 and non-electronic sources in accordance with the prescribed schedule 1020. The described exemplary system may also request that the applicant update credentials information on a prescribed schedule 1030 and continually send repeated requests for updated information until the requested information is received 1040.

Figure 9:
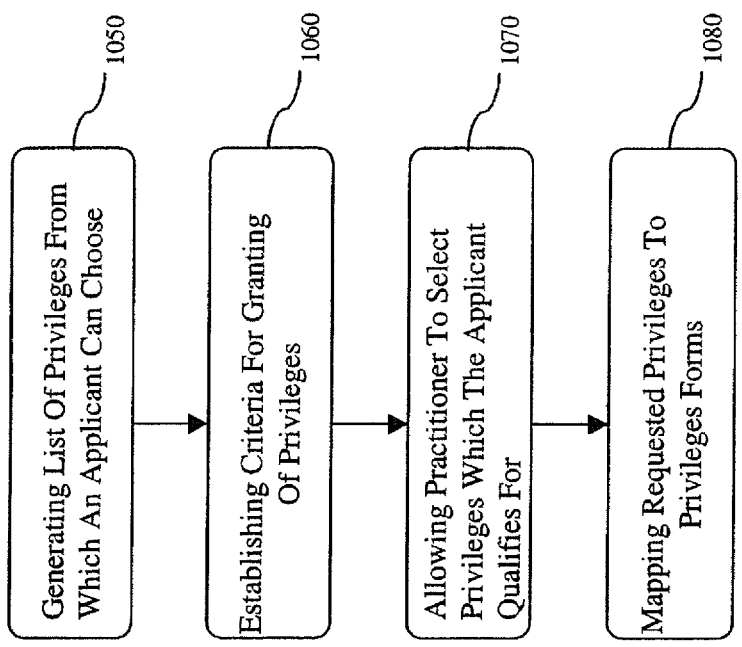
FIG. 9 graphically illustrates a process for allowing applicants to request privileges based upon analysis of credentials information in accordance with an exemplary embodiment of the present invention.

Referring to FIG. 9 an exemplary embodiment of the present invention may also allow applicants to request privileges based upon analysis of credentials information. For example an exemplary system may generate a list of privileges from which a practitioner in a particular field may select 1050. The described exemplary system may then establish criteria such as, for example, level of education, training and experience for the granting of each privilege 1060. The system may then compare the applicant's credentials with the required criteria and restrict the privileges which the applicant may select from to those for which the applicant has satisfied the specified criteria 1070. The system may then map the requested privileges to appropriate privileges forms 1080 which may then be automatically sent via email, fax or letter to external sources for review of competence.

In an online system, a "pop up" message may be generated when an applicant attempts to select a privilege which the applicant does not qualify for. The pop message may provide the reasons for privilege ineligibility. Alternatively, an exemplary system may auto-generate an email, fax or letter to the applicant that provides the reasons for privilege(s) ineligibility.

Figure 10:
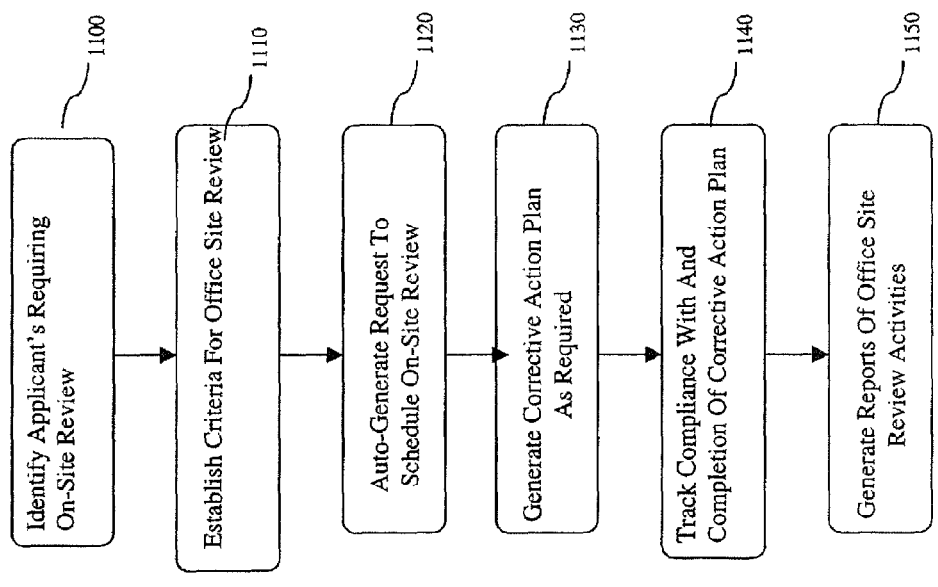
FIG. 10 graphically illustrates a process for reviewing select practitioner office sites in accordance with an exemplary embodiment of the present invention.

Referring to FIG. 10, an exemplary embodiment of the present invention may also allow for the review of select practitioner office sites. For example, in one embodiment an exemplary system may identify practitioners requiring office site review to satisfy the regulatory requirements, etc 1100. The system may then establish the criteria for the on-site review in accordance with the requirements for regulatory compliance 1100. The system may then auto-generate a request to schedule an on-site review 1120, generate review results and generate a corrective action plan, if required as a result of the review 1130. An exemplary system may track compliance with and completion of the corrective action plans 1140 and generate a report of the office site review activities 1150.

The invention described herein will itself suggest to those skilled in the various arts, alternative embodiments and solutions to other tasks and adaptations for other applications. It is the applicants' intention to cover by claims all such uses of the invention and those changes and modifications that could be made to the embodiments of the invention herein chosen for the purpose of disclosure without departing from the spirit and scope of the invention.

What is claimed is:

1. An electronic credentials verification system, comprising:
   electronic credentials records configured to contain credentials information of applicants;
   an electronic database adapted to organize the credentials records and permit real-time access to the records by authorized applicants and users;
   an electronic storage medium to store the database; and
   one or more computer servers adapted to manage the database and communicate electronically through a communications network to sources of verification data, the one or more computer servers being configured to:
   receive the credentials information pertaining to the applicants, receive information from the sources of verification data corresponding to one or more aspects of the credentials information pertaining to the applicants;

store the information received from the sources of verification data as part of the credentials records in the database, automatically verify on a substantially continuous basis one or more aspects of the credentials information based on information received from the sources of verification data, wherein the automatic verifying comprises:

automatically obtaining third party credential data and images of primary source data corresponding to the third party credential data;

software means for comparing the obtained third party credentials data to the collected credentials information pertaining to the applicant;

with the servers configured to notify a user of inconsistencies based on said comparison between the obtained third party credential data and the collected credentials information pertaining to the applicant; and with the servers enabling the applicant or user to review the third party credential information and the image of the primary source data that is the subject of inconsistency.

2. The system of claim 1, wherein one or more computer servers are further configured to request the credentials information pertaining to the applicants, and to automatically electronically re-request the credentials information until the credentials information is received.

3. The system of claim 2, wherein the credentials information includes a plurality of subsets of information, and the one or more computer servers are adapted to request further subsets of information based upon information in other subsets.

4. The system of claim 1, wherein the sources of verification data comprise licensing organizations, government agencies, or regulatory bodies.

5. The system of claim 1, wherein the one or more computer servers are adapted to encrypt the credentials records with a recipient's public key prior to sending the records over the communications network.

6. The system of claim 1, wherein the one or more computer servers are further configured to automatically pay verification fees.

7. The system of claim 1, wherein the one or more computer servers are configured to continuously, automatically and concurrently verify the credentials information for a number of different applicants.

8. The system of claim 1, wherein the one or more computer servers are further adapted to:

request verification information from the sources of verification data, receive the verification information from the sources of verification data, correlate the verification information received from the sources of verification data with the credentials information received pertaining to the applicants, and automatically update corresponding credentials records.

9. The system of claim 8, wherein the one or more computer servers are configured to archive the received verification information from the sources of verification data in an online data repository.

10. The system of claim 8, wherein the one or more computer servers are configured to electronically attempt to identify and resolve clerical errors in inconsistent data discovered when correlating the verification information.

11. The system of claim 10, wherein the one or more computer servers are adapted to automatically request explanations from the corresponding applicants or users of the inconsistent data pertaining to the applicants that cannot be resolved as clerical error.

12. The system of claim 8, wherein the one or more computer servers are adapted to request verification information from the sources of verification data by automatically re-requesting the verification information until the verification information is received.

13. The system of claim 1, wherein the one or more computer servers are further configured to audit the verification of the credentials information.

14. The system of claim 13, wherein the one or more computer servers are adapted to conduct a plurality of audits, each of which must be passed in order to pass the verification audit.

15. The system of claim 1, wherein the credentials information in the credentials records is available for review and annotation by their corresponding applicants or users.

16. The system of claim 1, wherein the credentials records are further configured to contain legacy data pertaining to the applicants.

17. The system of claim 1, wherein the credentials records are further configured to contain continuing education information of the applicants.

18. The system of claim 1, wherein the one or more computer servers are further configured to identify verification requirements for handling adverse information.

19. A method for electronically verifying information pertaining to applicants over a communication network, the method comprising:

providing an electronic database adapted to organize credentials records configured to contain credential information of applicants and permit real-time access to the records by authorized applicants and users;

receiving by one or more computer servers credentials information pertaining to the applicants over the communications network;

storing by the one or more computer servers the credentials information as part of the credentials records in the electronic database;

receiving by the one or more computer servers from one or more information sources, data corresponding to one or more aspects of the credentials information pertaining to the applicants;

storing the received data as part of the credentials records; and automatically verifying by the one or more computer servers on a substantially continuous basis, one or more aspects of the credentials information pertaining to the applicants based on data received from the one or more information sources, wherein the automatically verifying includes automatically invoking an electronic search over the communication network for automatically obtaining third party credential data and images of primary source data corresponding to the third party credential data;

comparing the obtained third party credentials data to the collected credentials information pertaining to the applicant;

notifying a user of inconsistencies between the obtained third party credential data and the collected credentials information pertaining to the applicant; and presenting the user with the third party credential information and the image of the primary source data.

20. The method of claim 19, wherein the automatically verifying includes: automatically correlating the received data with the one or more aspects of the credentials information; and
enabling notification of inconsistencies between the received data and the one or more aspects of the credentials information.

21. The method of claim 19, wherein the automatically verifying on a substantially continuous basis comprises:
performing an initial verification;
creating a re-verification calendar scheduling re-verification on a substantially continuous basis; and
automatically invoking an electronic search over the communication network for re-verifying one more aspects of the credentials information pertaining to the applicants in accordance with the created re-verification calendar.

22. The method of claim 21 further comprising:
receiving updated data in response to conducting a scheduled re-verification; automatically correlating the updated data with the credentials information; and automatically updating affected credentials records with the updated data.

23. The method of claim 19, wherein the one or more information sources are one of sources of verification data and other information sources.

24. The method of claim 19, wherein the invoking of the electronic search includes invoking a web crawler for obtaining the data over the Internet.

25. An electronic system for validating credentials of applicants, the system comprising:
a data storage device storing a database of electronic credentials records configured to contain credentials information of applicants, the data storage device being adapted to permit electronic access to the records by authorized applicants and users; and
one or more computer servers adapted to manage the database and communicate electronically through a communications network to sources of data relating to one or more aspects of the credentials information pertaining to the applicants, the one or more computer servers being configured to:
receive the credentials information pertaining to the applicants,
receive information from the sources of data corresponding to one or more aspects of the credentials information pertaining to the applicants;
store the information received from the sources of data as part of the credentials records in the database,
automatically validate one or more aspects of the credentials information based on information received from the sources of data automatically verify on a substantially continuous basis one or more aspects of the credentials information based on information received from the sources of verification data, wherein the automatic verifying comprises:
automatically obtain third party credential data and images of primary source data corresponding to the third party credential data;
automatically correlate the received information with the one or more aspects of the credentials information;
software means for comparing the obtained third party credentials data to the collected credentials information pertaining to the applicant;
with the one or more servers configured to notify a user of inconsistencies based on said comparison between the obtained third party credential data and the collected credentials information pertaining to the applicant; and
with the one or more servers enabling the applicant or a user to review the third party credential information and the image of the primary source data that is the subject of inconsistency.

26. The system of claim 25, wherein the one or more computer servers are configured to invoke an electronic search over the communications network relating to the one or more aspects of the credentials information, wherein the sources of data provide the information in response to the search.

27. The system of claim 26, wherein the invoking of the electronic search includes invoking a web crawler for obtaining the information over the Internet.

28. The system of claim 26, wherein the sources of data are one of sources of verification data and other information sources.

29. The system of claim 25, wherein the one or more computer servers are further perform an initial validation;
creating a re-validation calendar scheduling re-validation on a substantially continuous basis; and
automatically invoking an electronic search over the communication network for re-validating one more aspects of the credentials information pertaining to the applicants in accordance with the created re-validation calendar.

30. A computer device for verifying or validating credentials information pertaining to applicants, the computer device comprising:
a network interface for accessing a communication network;
an electronic database adapted to organize credentials records containing credential information of applicants and permit real-time access to the records by authorized applicants and users;
a processor programmed to communicate with a remote server over the network interface, the server being programmed to receive credentials information pertaining to an applicant, generate an electronic record for the applicant including the credentials information, with the generated electronic record stored in said electronic database, the server being further configured to collect from one or more external sources of information, over the communication network, data corresponding to one or more aspects of the credentials information, verify or validate the one or more aspects of the credentials information based on the collected data, automatically verify on a substantially continuous basis one or more aspects of the credentials information based on information received from the sources of verification data, wherein the server automatically obtains third party credential data and automatically obtains images of primary source data corresponding to the third party credential data; includes software means for comparing the obtained third party credentials data to the collected credentials information pertaining to the applicant and notifies applicant or a user of inconsistencies based on said comparison between the obtained third party credential data and the collected credentials information pertaining to the applicant and enables the applicant or user to review the third party credential information and the image of the primary source data that is the subject of inconsistency with the server further updating an aspect of the database based on results of the verifying or validating, the processor being further programmed to receive an output from the server based on the results of the verifying or validating; and a display coupled to the processor for displaying the output received from the server.

31. The device of claim 30, wherein the server is configured to collect the data corresponding to one or more aspects of the credentials information and perform the verification or validation, on a recurring basis.

32. The device of claim 31, wherein the recurring basis follows a set schedule.

33. The device of claim 30, wherein the results of the verifying or validating include an indication of absence of the one or more aspects of the credentials information in the received credentials information based on a comparison against the collected data, wherein the output is a notification of the absence.

34. The device of claim 30, wherein the results of the verifying or validating include an indication of absence of the one or more aspects of the credentials information in the collected data based on a comparison against the received credentials information, wherein the output is a notification of the absence.

35. The device of claim 30, wherein the collecting includes invoking an electronic search of the plurality of external sources of information over the communication network.

36. The device of claim 35, wherein the invoking of the electronic search includes invoking a web crawler for obtaining the data from the plurality of external sources of information.

37. The device of claim 30, wherein the external sources of information are one of sources of verification data and other information sources external to the remote server.

38. The device of claim 30, wherein the server is programmed to generate the electronic record in response to a command from the processor.

39. The device of claim 30, wherein the server is programmed to collect the data from the one or more external sources of information, in response to a command from the processor.

40. The device of claim 30, wherein the server is programmed to store the data collected from the one or more external sources of information as image data.

41. The device of claim 40, wherein the server is programmed to provide electronic access of the image data over the communication network.

42. The device of claim 30, wherein the electronic record of the applicant is modified based on a determination of absence of the one or more aspects of the credentials information when compared against the data collected from the one or more external sources.

* * * * *